Aug. 11, 1953     E. ALIOTTI     2,648,605
METHOD AND APPARATUS FOR TREATING RAISINS
Filed Feb. 24, 1948     6 Sheets-Sheet 4

Inventor
ENRICO ALIOTTI.
Alfred R. Fuchs
Attorney

Aug. 11, 1953    E. ALIOTTI    2,648,605
METHOD AND APPARATUS FOR TREATING RAISINS
Filed Feb. 24, 1948    6 Sheets-Sheet 5

Inventor
ENRICO ALIOTTI.

Alfred R. Fuchs
Attorney

Patented Aug. 11, 1953

2,648,605

UNITED STATES PATENT OFFICE 2,648,605

METHOD AND APPARATUS FOR TREATING RAISINS

Enrico Aliotti, Rhodes, Dodecanese, Greece, assignor to Aliotti and Gier, Kansas City, Mo., a copartnership Application February 24, 1948, Serial No. 10,282

22 Claims. (Cl. 99—104)

My invention relates to a method and apparatus for treating raisins.

My invention particularly relates to a process for bleaching, glazing and sterilizing raisins and the apparatus for carrying out said process.

It is a particular purpose of my invention to provide a continuous process for producing bleached raisins, the process being carried out by means of a series or set of drums rotating on horizontal axes.

It is a further purpose of my invention to provide a new and improved apparatus for treating raisins, comprising drums that are provided with means for continuously moving the raisins from one end of the drum to the other end thereof and at the same time continuously agitating and carrying the raisins upwardly on shelves and dropping the same off said shelves through the space within the drum, thus keeping the raisins moving continuously in a desired direction while at the same time keeping said raisins continuously agitated and continuously in contact with the various fluids with which the same may be treated.

In carrying out my improved method of treating raisins, raisins are used that are made from grapes that are light colored but which turn dark during the drying process. One of the important purposes of my invention is to provide a method of producing a light colored raisin from grapes that have been sun dried without having been treated with sulphur dioxide or otherwise bleached before or during the drying process. Instead of utilizing grapes that have been bleached, the grapes are sun dried to produce the raisins without their having been subjected to any other treatment, and the raisins that have turned dark due to the drying process are then treated by my improved raisin treating process.

More specifically my invention comprises a method of treating raisins that have been sun dried, that are in a damp or wet condition due to having been washed and sieved prior to being subjected to my improved method. The wet or damp raisins are first subjected to a bleaching action by means of sulphur dioxide and are then sprayed with suitable oil and subjected to a heating process. If the raisins that are being treated are unusually dark, further sulphurization can be provided for during the heating thereof.

My method further includes the removing of the sulphur dioxide from the raisins after it has been utilized to bleach the same, so as to produce a raisin that is substantially entirely free of sulphur dioxide, thus producing a very wholesome product. The de-sulphurizing of the raisins is accomplished by passing the same through a chamber in which the raisins are continuously agitated and moved forwardly while being contacted by heated air and the de-sulphurizing is completed by contacting the raisins with unheated air, which may be cooled air if desired. Preferably, such cooling is by means of a blast of air contacting the raisins that are being continuously agitated, and is carried out in two steps in two separate chambers, which are supplied with air from externally of the apparatus, which is free of sulphur dioxide.

After the raisins have been thus cooled and de-sulphurized the same are further sieved and sized and packed.

My improved method produces a raisin that is substantially entirely free of sulphur and which has a glossy appearance and a non-sticky surface and a light golden color.

It is another important purpose of my invention to provide an apparatus for treating raisins so as to produce the above referred to finished product, which comprises a plurality of chambers that are provided with drums for keeping the raisins in constant movement and in constant contact with the air and other gases that may be in the chambers or passed through said chambers so that all of the raisins on all of their surfaces are contacted by the treating medium in each of the chambers. Said chambers comprise a sulphurization chamber, a heating chamber, which may also be utilized for further sulphurization of the raisins, and which is provided with means for spraying an oil on the raisins, a heating chamber forming part of the de-sulphurizing means, and a plurality of chambers through which cool air is passed to cool and further de-sulphurize the raisins.

It is a specific purpose of my invention to provide means for continuously moving and exposing the raisins to the action of the treating mediums in the various chambers, consisting of drum-like members that are provided with a plurality of wide shelves that are arranged at an inclination to the radius of the drums and which also incline relative to the axis of rotation of the drums, said shelves extending inwardly from the walls of the drums and said drums being arranged in axial alignment, but with the shelves of adjoining drums located so that the raisins passing off of the lower ends of the shelves of one drum in a chamber will drop onto the upper ends of the next lower shelves on the adjacent drum.

Other objects and advantages of my invention will appear as the description of the drawings proceeds. I desire to have it understood, however, that I do not intend to limit myself to the particular details shown or described, except as defined in the claims.

Figure 1:
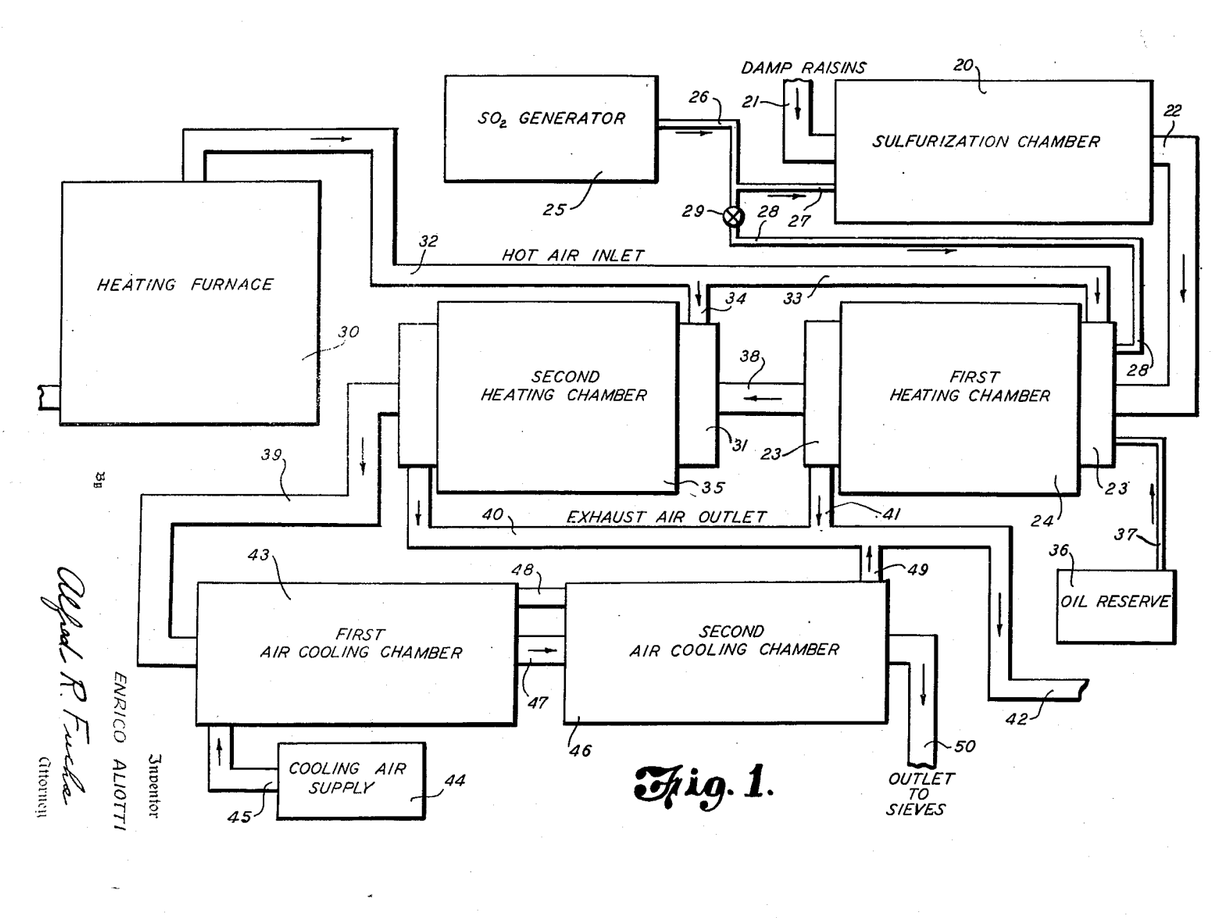
Fig. 1 is a diagrammatic view of the apparatus utilized for carrying out my improved raisin treating method.

Referring in detail to the drawings, in Fig. 1 the apparatus for carrying out my improved process for treating raisins is shown diagrammatically, the chamber 20 being a sulphurizing or bleaching chamber and the raisins being introduced into said chamber through a supply conduit 21. The supply conduit 21 may be merely a hopper or any suitable conveying means for carrying the raisins that have been previously washed, preferably, at least three times, and sieved so as to remove the main stems and other large foreign matter therefrom, into the chamber 20. The raisins will thus be in a damp or wet condition as the same enter the chamber 20 from the supply conduit 21. After the raisins have been treated by subjecting the wet raisins to the action of sulphur dioxide in the chamber 20, the same pass through a suitable conduit 22 into a chamber 23, which has a housing 24 for heating the walls of the chamber 23 extending around the major portion thereof. The chamber 23 is primarily a heating chamber, but may also be used as a second sulphurizing chamber. In addition to heating the raisins in the chamber 23 the same are sprayed with vaseline oil as the raisins enter the chamber, so as to eliminate any stickiness of the raisins and to glaze the same.

The means for supplying sulphur dioxide to the chambers 20 and 23 comprises a suitable generator 25 from which a supply pipe 26 extends, which has a branch 27 that extends into the chamber 20 at the end thereof, into which the supply conduit 21 leads, and a branch 28, which is provided with a valve 29 so that said branch 28 can be cut off from the generator or connected therewith, as may be found desirable, said branch 28 leading to the inlet end of the chamber 23.

A furnace 30 is also provided for heating the chamber 23 and the chamber 31, which will be described more in detail below. The heating means for the chambers will be described more in detail in the detailed description of the various figures of the drawings, but in Fig. 1 is indicated diagrammatically as comprising a conduit 32 leading from the furnace 30, which has branches 33 and 34 that lead into the inlet ends of the chambers 23 and 31, respectively. The chamber 31 is also provided with a housing 35, similar to the housing 24. The oil is supplied to the spraying means in the chamber 23 from a suitable oil supply tank 36, through a suitable conduit 37 leading into the inlet end of the chamber 23.

While the raisins are subjected to the action of the sulphur dioxide gas in the chamber 20, said raisins are continuously being turned over and exposed on all surfaces thereof to the sulphur dioxide by the continuous agitation and movement thereof, and at the same time are being conveyed from the inlet end toward the outlet end of the chamber. Due to such continuous agitation and movement of the raisins, the same are more thoroughly acted on and more uniformly acted on by the sulphur dioxide than would otherwise be the case, and are also prevented from sticking together. Furthermore, due to the fact that the raisins are wet when entering the chamber, the action of the sulphur dioxide will be more rapid and more thorough than if the raisins were dry.

The raisins, after passing from the chamber 20 and into the chamber 23, are similarly continuously moved and agitated and turned over so as to be exposed to the action of the oil spray and the heat and the sulphur dioxide, if additional sulphur dioxide is found to be necessary for the proper treatment thereof in the chamber 23. Thus all surfaces of all the raisins are properly coated with the vaseline oil and are subjected to the heat in the chamber 23 while being moved continuously from the inlet end thereof, where the supply conduit 22 enters the same, to the opposite end thereof, where the same are discharged through any suitable means, such as a conduit 38, into the chamber 31.

A certain amount of heating will, of course, take place in the chamber 20 because of the fact that the sulphur dioxide has been produced by a process of burning sulphur, but the heating action in this chamber is of no consequence. However, the heated air supplied to the chambers 23 and 31 through the conduit branches 33 and 34 is, preferably, supplied at a temperature of about 150° C. The heating to this temperature of the raisins in the chamber 23 provides for the ready absorption of the vaseline oil that is sprayed on the same, and also expands the pores of the raisins, which allows the sulphur dioxide to be more easily drawn off in the succeeding steps of the process.

The chamber 31 is primarily a heating chamber and is for the purpose of carrying out the first step of driving the sulphur out of the bleached raisins. The raisins in the chamber 31 are subjected to the same agitating and conveying action as in the chambers 20 and 23, being continuously agitated and repeatedly dropping through the air in the chamber 31 as the same travel from the inlet end of said chamber to the discharge end thereof. The chamber 31 is provided with a discharge conduit 39 leading therefrom for discharge of the raisins, and an air exhaust conduit 40, which is shown as being connected with an air exhaust conduit 41 leading to an air discharge conduit 42 that leads to the atmosphere, any suitable means being provided for drawing the air out through the conduit 42 and discharging the same to the atmosphere.

The raisin conduit or conveying means 39 leads into the inlet end of a chamber 43, which carries out the second step of the de-sulphurizing process. Cooling air is supplied to the chamber 43 from suitable supply means 44 through an air supply conduit 45. The air that is used for cooling is usually supplied at the temperature of the air externally of the apparatus or may be cooled further if so desired. The blast of cooling air passing through the chamber 43 lengthwise thereof, which chamber is provided with the conveying and agitating means that keeps the raisins constantly in movement and repeatedly passes the same through the air stream in the chamber 43, completely de-sulphurizes the raisins ordinarily. However, in order to be positively assured of this, another de-sulphurizing and cooling chamber 46 is provided, a conduit 47 being shown for passage of the raisins from the discharge end of the chamber 43 into the inlet end of the chamber 46, and an air passage 48 being shown for supplying the cooling air to the inlet end of the chamber 46. An air discharge conduit 49 leads from the chamber 46 into the air discharge conduit 42, and a discharge conduit 50 for the treated raisins leads from the discharge end of the chamber 46, the raisins passing through the discharge outlet 50, then being sieved in the usual manner to remove any small stems and sticks that were not previously eliminated. Finally, the raisins pass into a sieve where the same are sized, after which the same are ready for packing. In Fig. 1, in which the apparatus is shown diagrammatically, the arrows shown on and adjacent the various conduits indicate the direction of flow of the various materials through the same from chamber to chamber and from the sulphur dioxide generator, the heating means and the oil supply to the various chambers.

Figure 2:
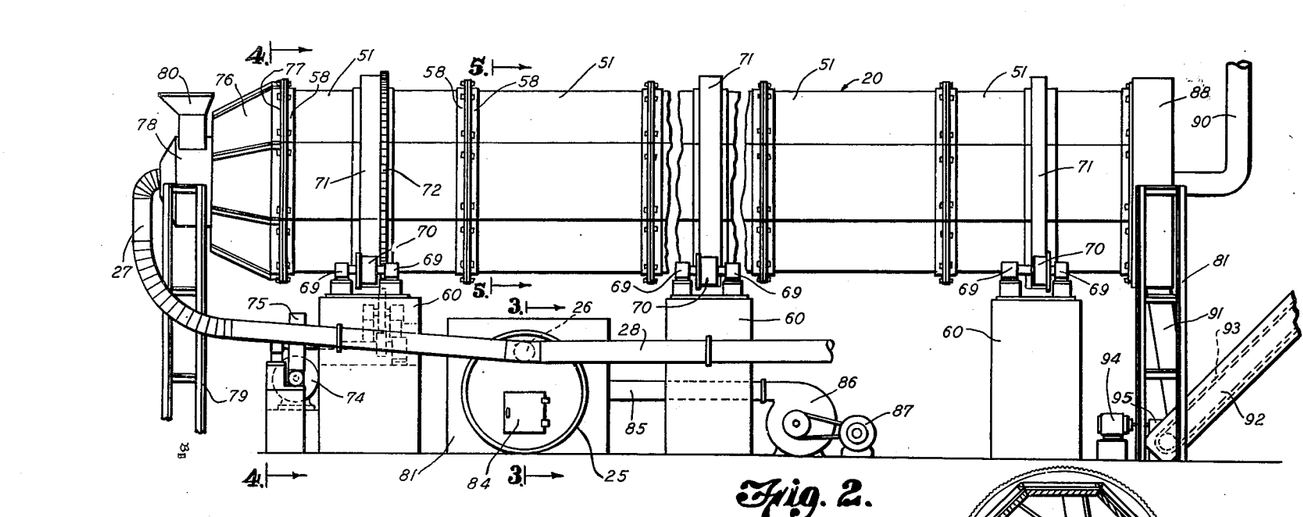
Fig. 2 is a view in side elevation, partly broken away, of the chamber in which the first sulphurization stage of the process is carried out.
Figure 3:
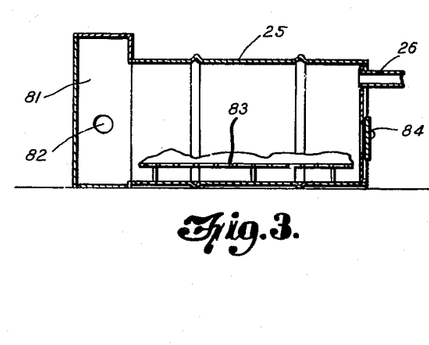
Fig. 3 is a sectional view, partly broken away, taken on the line 3—3 of Fig. 2.
Figure 4:
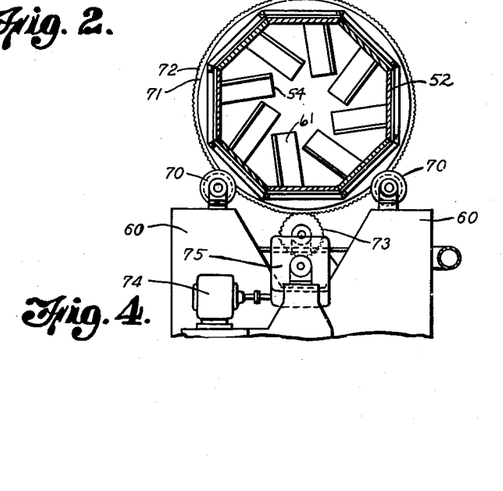
Fig. 4 is a section taken on the line 4—4 of Fig. 2, partly broken away.

The details of construction of the chamber 20 and its appurtenances are shown in Figs. 2 to 4, inclusive. Said chamber 20 is made up of a series of drums 51, which are duplicates in construction and are arranged in co-axial arrangement end to end in a series, the number of drums used in the construction of the chamber 20 being variable. It has, however, been found that a series of nine drums arranged co-axially in end to end relation is quite suitable for the construction of the sulphurization chamber 20.

Figure 5:
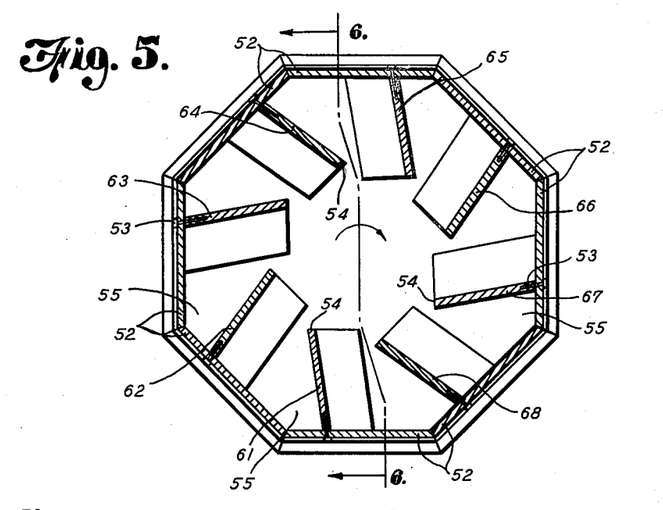
Fig. 5 is a vertical sectional view through one of the drums used in my raisin treating apparatus.
Figure 6:
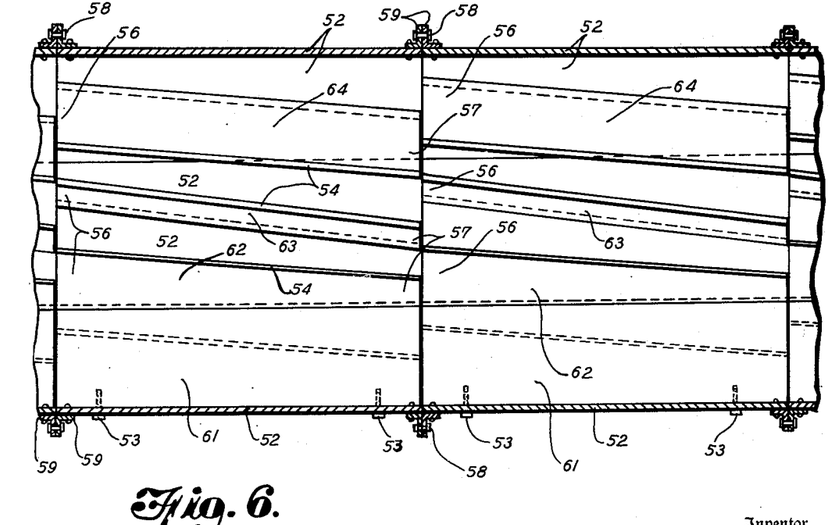
Fig. 6 is a fragmentary longitudinal sectional view through a series of said drums, showing two drums, the section being taken on a line corresponding to the line 6—6 of Fig. 5.

As the drums 51 are used throughout the apparatus and are all of the same size and of the same construction, reference is had to Figs. 5 and 6, which show the details of construction of the drums 51. Said drums have a wall of a polygonal character, being shown as being made up of eight flat sides 52, which are secured together in substantially fluidtight relation along their meeting edges, to thus provide a regular octahedral drum open at its ends.

Each of the flat walls 52 has a shelf secured thereto, projecting inwardly toward the axis of rotation of the drum, by suitable securing elements 53 extending endwise into the shelves and extending through the wall portions 52. The shelves are each designated by a different reference numeral in Figs. 5 and 6 in order to more readily explain the operation of the apparatus, said shelves being designated by the numerals 61, 62, 63, 64, 65, 66, 67 and 68. The shelves are all duplicates, however, but different reference numerals are used in order to define the position of the various shelves as shown particularly in Fig. 5. The drum is rotated in the direction indicated by the arrow in Fig. 5 in the operation of the device. The raisins having been fed into the apparatus or fed from one drum to another, will tend to pass to the lowermost portion of the drum. Thus as the drum rotates in the direction indicated in Fig. 5, the raisins will be lodged between the left portion, as viewed in Fig. 5, of the wall 52, to which the shelf 61 is secured, and said shelf 61, and also between said shelf and wall 52 that lies to the left of that carrying the shelf 61 as viewed in said figure.

As each shelf passes from the position of the shelf 61 in Fig. 5 to the position of the shelf 62 in Fig. 5, the raisins will pass downwardly along the walls 52 to lie closer to the shelf 62 and in the recess between the shelf 62 and the wall portion 52 to the left thereof as viewed in Fig. 5, and when the shelves pass to the position shown for the shelf 63 in Fig. 5, the raisins will be supported principally on the shelf 63 toward the side edge thereof nearest the wall 52 to which said shelf is secured. However, in passing from the position of the shelf 63 to the position of the shelf 64 the raisins will begin traveling downwardly along the upper surface of the shelf 64 toward the inner end 54 of said shelf, and will drop off the end 54 of the shelf 64 and down onto the shelf 61 and the shelf 68, and possibly some onto the shelf 67 and will, due to the inclination of the shelves 68 and 61, pass into the space between the walls 52 and the shelves 61 and 68 to the right of said shelf 68, and as the drum rotates the raisins lying between the shelves 61 and 68 will pass onto the shelf 68 as it travels upwardly from the position shown in Fig. 5 to the position that the shelf 63 has in Fig. 5 and will again pass off said shelf when it gets into the inclined position shown for the shelf 64. A shelf in the position shown for the shelf 67 in Fig. 5, if it receives any of the raisins discharged from the shelf that is in the position shown for the shelf 64, will discharge the raisins onto the shelf 68 into the space between the shelf 68 and the wall 52, to which said shelf 68 is secured, in the pocket that would exist to the right of said shelf 68 between the shelf 68 and said wall 52. If any of the raisins are not discharged while the shelves are traveling upwardly, due to any tendency to adhere to the shelves, these will be discharged when the shelves reach the position shown for that of the shelf 65 in Fig. 5, or certainly by the time that the shelves reach the position shown for the shelf 66 in Fig. 5, in which position the shelf will be completely inverted. However, the majority of the raisins will slide off the lower edges 54 of the shelves when the shelves are in the position shown for the shelf 64. The shelves and the walls of the drums are, preferably, made of a material to which the raisins do not readily adhere and which is not affected by sulphur dioxide. Zinc has been found to be particularly satisfactory.

It will be noted that each of the shelves is slightly inclined to the radial, that is, it is not perpendicular to the wall 52, to which it is secured, but inclines in a direction transversely of the shelf so that the inner edge 54 of each shelf is forwardly, in the direction of rotation of the drum, of the outer edge thereof secured to the wall 52, the angle between each shelf and the wall to which it is secured being 83°. By providing a transverse inclination to each shelf, such as above described, the shelves will each pass to a higher position in the drum before the raisins thereon roll off the edge 54 and drop downwardly, than if the shelves were arranged perpendicularly to the walls to which the same are attached. It will also be noted that each shelf at its outer end is secured to the wall 52, that carries it, nearer to the wall 52 in advance thereof, in the rotation of the drum, than to the wall 52 that follows the same, thus providing a more definite pocket 55 between the two angularly arranged adjacent walls 52 and said shelf than would otherwise be the case.

The shelves are not only slightly inclined transversely of their length, but also inclined lengthwise thereof so that said shelves are higher toward the end of each drum 51 that faces the inlet end of the apparatus in which the drum is utilized than the other end thereof. This will be obvious from Fig. 6, in which it will be noted that the ends 56 of each of the shelves are considerably higher than the ends 57 thereof. Accordingly, as the raisins move in the pockets above the upwardly traveling shelves 62 and 63 and along the shelves 62, 63 and 64 in a transverse direction in their upward travel as the drum rotates, the agitation of the raisins produced by such movement will also cause the raisins to travel lengthwise of the shelves toward the discharge ends 57 thereof from the receiving ends 56 thereof, this being particularly true of shelves in the position of the shelves 63 and 64 and in passing between the position of the shelf 63 and the position of the shelf 64 shown in Fig. 5. Accordingly, as the drums 51 rotate the raisins will be discharged a plurality of times from shelves that are inclined downwardly toward the inner ends 54 thereof as, for example, the shelf 64 in Fig. 5, this occurring with each shelf as it reaches approximately the position shown for the shelf 64, and each successive time that the raisins drop off the edge 54 of a shelf, the raisins will have passed farther along the longitudinally inclined shelf toward the lower end thereof. The raisins are thus not only carried upwardly by the shelves in the drum and dropped through the space within the drum, but are, each time that the upward carrying and dropping action takes place, advanced axially of the drum toward the discharge end of the chamber of which the drums form a part.

The drums are connected together end to end by means of fastening elements 58 that pass through flanges 59 provided at the ends of the respective drums. However, the adjacent drums are not connected together in such a position that the shelf-like members are continuous from one drum to the next, but instead are so connected together that the receiving ends of the shelves in the various drums are in alignment with each other, as are also the discharged ends, but the discharge end of a shelf in a drum will be located above the receiving end of a shelf of the next adjacent drum section that is located toward the discharge end of the chamber therefrom, this being due to the angle of inclination of said shelves longitudinally of the drums. This will be evident from Fig. 6, wherein the drum shown at the left will discharge raisins from the lower ends 57 of the shelves 62, 63 and 64, respectively, onto the upper ends 56 of the shelves 61, 62 and 63 in the drum shown at the right in Fig. 6. The longitudinal inclination of the shelves to the horizontal is only from about 5° to 6°.

In Fig. 2 the drum members 51 are secured together in the manner described above, so as to form a chamber that rotates as a unit. Because of the great length of the resulting chamber, the drums are broken away at each side of the midportion of the chamber. Said drum is mounted on suitable supporting members 60, which are provided with bearings 69 for flanged rollers 70, which have the rings 71 mounted on the drums at opposite ends and at the middle of the connected series, engaging therewith so as to rotatably mount the chamber made up of the series of drums 51 on the supporting means, said rings 71 having flat inner faces secured to the drums spaced from their rolling surfaces so that the rolling surface of each ring 71 that engages the roller 70 is spaced sufficiently from the apexes where the flat wall portions 52 meet that the flanges on the rollers 70 will clear said apexes.

One of said drums is also provided with a ring gear 72 which is engaged with a pinion 73 that is driven by a motor 74 through a reduction gearing 75, the drive being such that the rate of rotation of the drum is quite slow, the rate being, preferably, about one revolution per minute.

At the inlet end of the chamber 20 a tapering housing member 76 has a flange 77 thereon that is secured to the flange 58 of the first drum member 51. Thus the tapering inlet member 76 rotates with the drums 51. An inlet chamber 78, which is stationary, being mounted on a suitable framework 79, extends into the tapering housing portion 76 and in the form of the invention shown, a hopper 80 is provided, into which the washed and sifted wet raisins are manually inserted so as to enter the housing portion 78 and thus the drums 51 through the inlet chamber 76.

The stationary housing member 78 has the sulphur dioxide conduit 27 entering the same, the same extending from the generator 25. The generator 25 has a substantially cylindrical body portion and has a rectangular housing 81 at one end thereof that has an air inlet opening 82 into the same, the sulphur dioxide conduit 26 leading to the conduit 27 and the branch conduit 28 extending from one end of the cylindrical body portion of the sulphur dioxide generator, which generator is provided with a grate 83 upon which sulphur is burned in any suitable manner to create the sulphur dioxide, entrance to the combustion chamber being obtained through a door 84. The air is supplied to the rectangular housing 81 through a conduit 85 that extends from a blower 86, which is driven by a suitable motor 87. While a forced draft is shown for the sulphur dioxide generator, such is not absolutely necessary, but is preferred.

At the outlet end of the chamber the endmost drum 51 extends freely rotatably into a stationary housing 88, which is mounted on a suitable framework member 89, from which a discharge pipe 90 extends to the outer atmosphere, this being provided for the discharge of any sulphur dioxide fumes passing through the rotating chamber made up of the drum-like members 51. A raisin discharge conduit 91 extends downwardly from the lowermost point of the housing 88 to a conveyor housing 92 in which a suitable conveyor 93 is mounted, which is driven by the motor 94 through a reduction gearing 95 and which operates in a direction to carry the raisins discharged into the same upwardly in the housing 92 to the next treating chamber, the housing 92 and conveyor 93 corresponding to the conduit 22 shown diagrammatically in Fig. 1.

Figure 7:
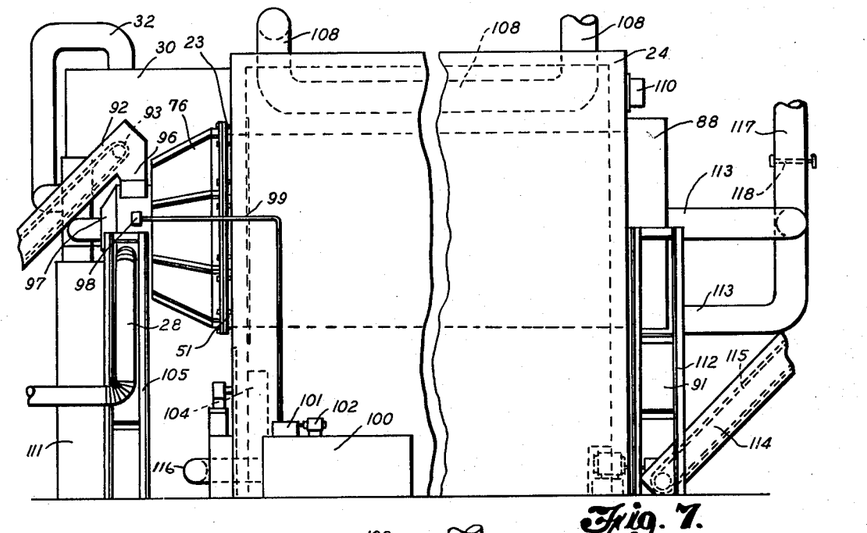
Fig. 7 is a view in side elevation, partly broken away, of the chamber in which the second sulpherization and the heating and oiling steps of my improved method are carried out.

The chamber 23 is shown more in detail in Fig. 7. The conveyor housing 92 has a downwardly extending discharge portion 96, which empties into the stationary inlet chamber 97 that is mounted on a suitable frame 105. The housing 23 is made up of a plurality of the drums 51 and has a tapering inlet chamber 76 that is secured to the first drum 51 and rotates therewith, into which the stationary inlet chamber 97 extends. The chamber 23 also has a stationary housing 88 at the outlet end thereof. As the raisins pass off the conveyor 93 through the passage 96 into the chamber 97 and from said chamber into the inlet chamber 76, said raisins pass through an oil spray, which is produced by a spraying device 98, which is provided on the end of an oil supply pipe 99 extending from an oil reservoir 100, the oil being pumped from the tank 100 to the spraying device 98 by means of a pump 101 driven by a motor 102.

The drums 51, forming the chamber 23, are secured together in end to end relation in the same manner as the drums 51 that form the chamber 20. The number of drums secured end to end to form the chamber 23 is, preferably, the same as that used to form the chamber 20. Also the chamber 23 is rotated at substantially the same speed as the chamber 20 and is mounted in a similar manner for rotation about its longitudinal axis, being driven by a motor 103 through a reduction gearing 104, which is similar to the reduction gearing 75, in a similar manner to the chamber 20.

The furnace 30 has the hot air duct 32 extending therefrom to the inlet end of the blower 106 and the duct 107 extends into the conveyor housing 92, thus supplying heated air from the air heating chamber of the furnace 30 to the interior of the chamber 23. The sulphur dioxide duct 28 extends into the stationary inlet chamber or housing member 97, extending from the sulphur dioxide producer 25 shown in Fig. 2. Sulphur dioxide will only be supplied through the duct 28 when this is desirable, because of the color of the raisins, the valve 29 shown in Fig. 1 being closed when no sulphur dioxide is to be fed to the chamber 23.

Figure 8:
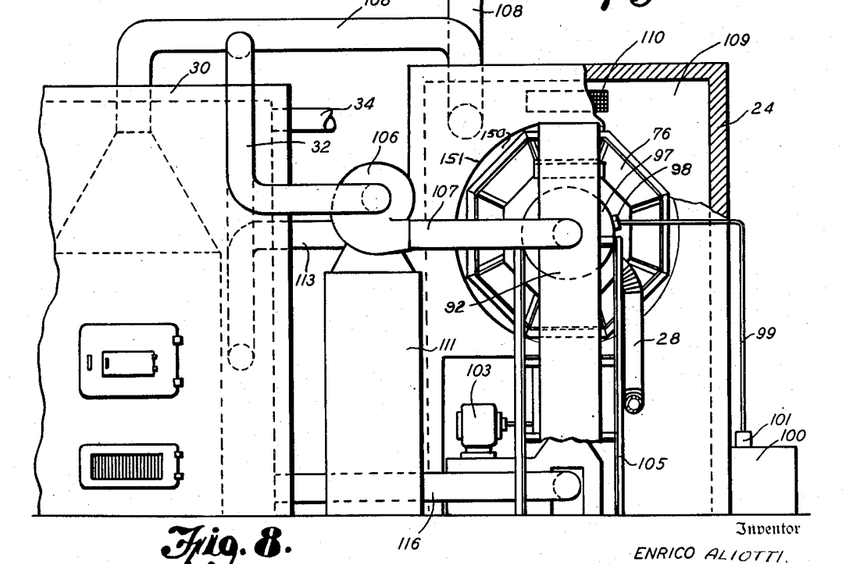
Fig. 8 is an end view thereof, partly broken away, showing a portion of the heating apparatus for the chamber.

The chamber 23 has the housing 24 around the same, which is, preferably, a brick walled chamber, or a chamber of similar construction. The housing 24 serves as additional heating means for the chamber 23, surrounding the rotating portion of the chamber, the smoke pipe 108 for the products of combustion from the furnace 30 extending into and longitudinally through the air space 109 provided between the walls of the housing 24 and the rotating chamber 23, thus preheating the walls of the chamber 23 from the products of combustion from the furnace 30. An air inlet 110 is provided on the discharge end of the housing 24. The blower 106 may be mounted on any suitable support 111 to elevate the same and the stationary outlet chamber 88 is mounted on any suitable frame member 112. A return pipe 113 may be provided, extending from the stationary outlet chamber 88 back to the air heating chamber in the furnace 30 to provide a closed circuit for the circulation of heated air between the housing 23 and the furnace 30. The heated air that is supplied to the chamber 23 is, preferably, heated to a temperature of about 150° C.

From the stationary housing or outlet chamber 88 a raisin discharge conduit 91, which is the same as that shown for the chamber 20, discharges the raisins passing out of the discharge end of the chamber 23 and into the housing 88 into the lower end of a conveyor housing 114, which is similar to the conveyor housing 92, and has a conveyor 115 therein for conveying the raisins upwardly to the upper end of the housing 114, where the same are discharged into the next treating chamber, to be described below. Not only are the walls of the chamber 23 heated by passing the smoke pipe 108 through the air chamber 109, but air entering through the air inlet 110 is preheated in the chamber 109 and will pass through the conduit 116 into the heating chamber of the furnace 30.

When no sulphur dioxide is introduced through the conduit 28, then the air can be circulated in a closed circuit comprising the heating chamber of the air heating furnace 30 and the chamber 23, but when sulphur dioxide is introduced into the chamber 23 through the conduit 28, then suitable means comprising a discharge pipe 117 and a valve 118, which is adapted to assume a position to direct the air discharged through the pipe 113 to the atmosphere, as through the exhaust pipe 140, is utilized to divert the air containing sulphur dioxide from the furnace, at which time fresh air will have to be drawn in through the air inlet opening 110 to the air heating furnace 30, inasmuch as the same furnace is used for supplying heated air to another chamber in which no sulphur dioxide should enter. In order to reduce escape of preheated air between the chamber 23 and housing 24, a ring 150 is provided on the first drum 51 adjacent the inlet member 76, which overlaps the edge of a circular opening 151 in the end wall of the housing 24 (see Fig. 12).

In the chamber 23 the raisins are agitated and pass through the space within the drum, from a higher shelf or shelves to a lower shelf or shelves, and advance lengthwise of the series of drums from the inlet end to the outlet end of the chamber in the same manner as was described in connection with the chamber 20. At the same time heated air engages the raisins repeatedly as the same pass through the stream of air flowing lengthwise through the chamber. Also the raisins which pass in a relatively thin stream or layer off the end of the conveyor 93 are exposed to the oil spray and are thoroughly agitated after being sprayed so that oil will be uniformly distributed throughout the mass of raisins and will be uniformly distributed over the surface of the individual raisins. If the raisins are too dark, then the sulphur dioxide supplied through the conduit 28 will further bleach the same. The combination of heat and oil will soften and glaze the raisins and eliminate any stickiness that the same might have, and at the same time open the pores of the raisins so that the sulphur dioxide can be driven from the same more easily than would otherwise be the case.

Figure 9:
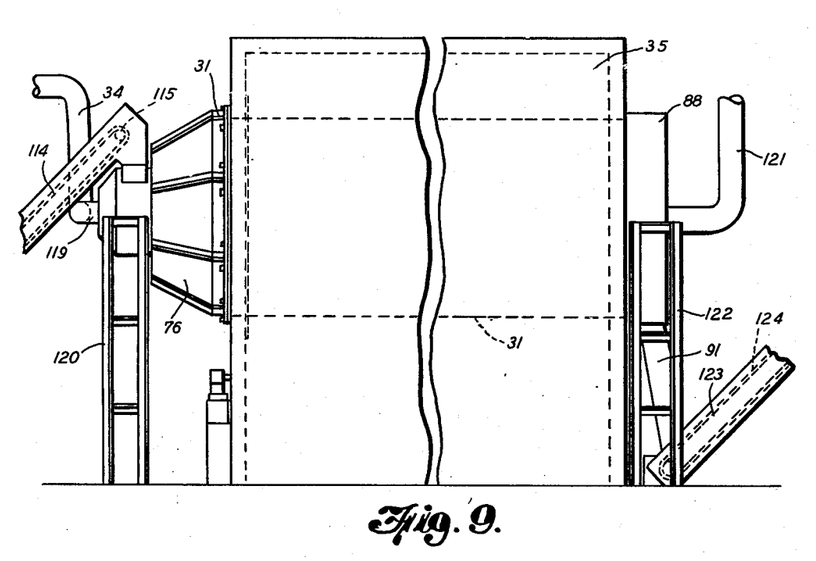
Fig. 9 is a view similar to Fig. 7 of the second heating chamber, in which the first step of the desulphurization of the raisins is carried out.

The conveyor housing 114 extends to the heating chamber, which is enclosed in a housing 35 that is, preferably, also brick walled, being mounted in the housing 35 in a similar manner to that in which the chamber 23 is mounted in the housing 24. The conveyor 115 mounted in the conveyor housing 114 discharges the raisins, that have been treated in the chamber 23, into a stationary inlet chamber 119, which is mounted on the frame member 120 and into which the heated air conduit 34 extends from the furnace 30. Hot air at a temperature of 150° C. is thus supplied to the inlet chamber 119 and through the tapering end member 76, such as previously described, which rotates with the chamber 31 made up of the drums 51, to the chamber 31, the inlet chamber 119 extending into the opening into the tapering end portion 76 of the chamber 31. The chamber 31 is rotated in a similar manner to the chambers 20 and 23 and is mounted for rotation in a similar manner, said chamber 31 being, preferably, made up of the same number of drums arranged end to end as the chambers 23 and 20.

Figures 11, 12:
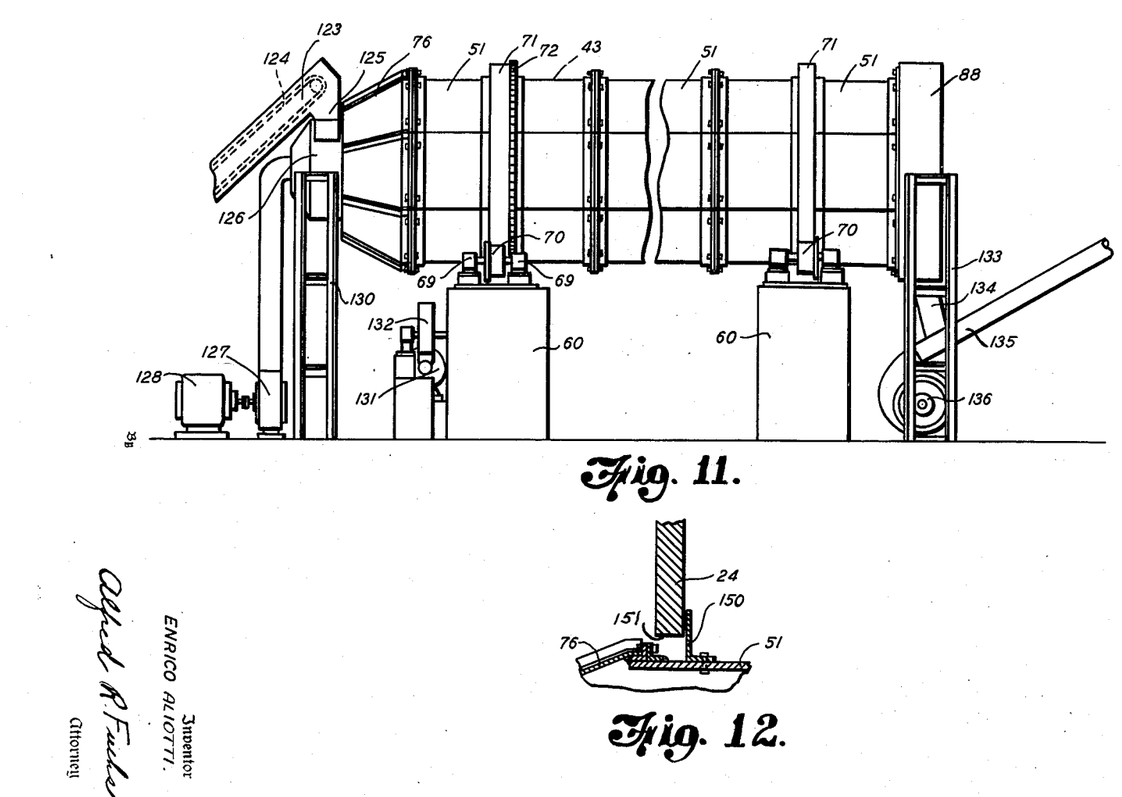
Fig. 11 is a similar view of the final cooling and de-sulphurizing chamber.
Fig. 12 is an enlarged fragmentary sectional view through a portion of a heating chamber and a housing wall.

The chamber 31 is also provided with a stationary discharge housing or outlet chamber 88, such as previously described, from which an air return conduit 121 extends back to the air chamber in the furnace 30. The housing member 88 is mounted on a suitable frame member 122 and extends into the housing 35 and the chamber 31 extends into said stationary housing 88 at its discharge end. The raisins, which are subjected to engagement with the heated air passing through the chamber 31 during their passage through the chamber while being agitated and drop through the stream of heated air, repeatedly advance from the tapered end 76 through the various drums making up the chamber 31, to the stationary outlet chamber 88 and are then discharged through a raisin discharge conduit 91, such as previously described, into the bottom of a conveyor housing 123, which has a conveyor 124 therein, onto which said raisins are fed and which carries the raisins upwardly to the discharge end of the housing 123, which, as shown in Fig. 11, has a downwardly extending leg portion 125 that empties into the stationary inlet chamber 126 leading into the first air cooling chamber 43.

A blower 127, driven by means of a motor 128, supplies outside air through the conduit 129 to the stationary inlet chamber 126, which is mounted on a suitable frame member 130. The cooling chamber 43 is made up of drum members 51 arranged end to end (preferably nine), which are mounted in the same manner for rotation as the drums 51 forming the chamber 20, and are similarly mounted for rotation as the members 51 that are secured end to end to form the chamber 20, the same reference numerals being applied to the corresponding parts in Figs. 2 and 11. Rotation of the chamber 43 is obtained in the same manner as the chamber 20 through a gearing including the ring gear 72 shown in Fig. 11, which is driven in a similar manner to that illustrated in Figs. 2 and 4 by means of a motor 131 through a suitable reduction gearing 132. The chamber 43 is provided with a tapering inlet chamber 76, which is mounted in the same manner as previously described and into which the stationary chamber 126 extends.

Figure 10:
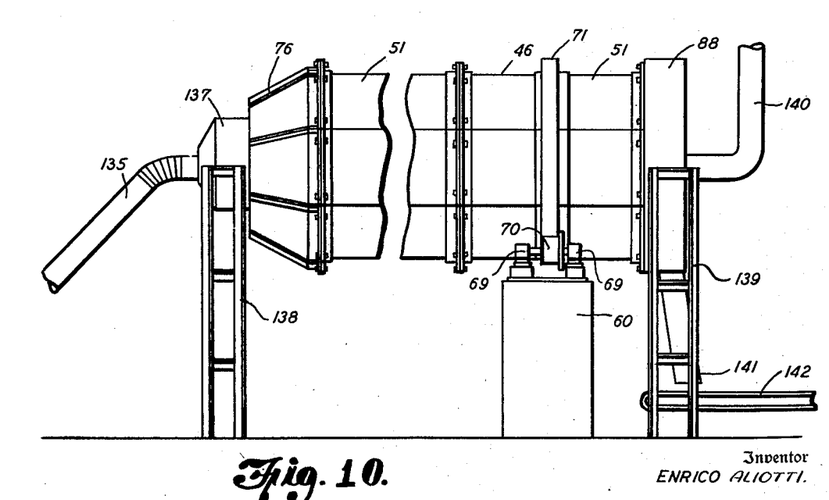
Fig. 10 is a similar view of the second de-sulphurization chamber, which also serves as a cooling chamber.

The raisins have been subjected to the stream of hot air in both the chambers 23 and 31, and in the chamber 31 the de-sulphurization process begins, the heated air driving the sulphur dioxide from the raisins. The blast of air supplied by the blower 127 cools the raisins and further removes the sulphur dioxide therefrom due to the repeated engagement of the air stream with the raisins that have been previously subjected to heated air to open the pores thereof. The repeated engagement of the raisins with this stream of outside air is accomplished due to the shelf structure previously described, which agitates the raisins continuously, repeatedly drops the same through the air stream and advances the raisins continuously toward the stationary housing 88, similar to that previously described, which constitutes an outlet or discharge chamber mounted on a frame member 133, from which a raisin discharge conduit 134 extends into a conduit 135. The raisins that pass into the conduit 135 are blown upwardly in the conduit 135 by means of the blast of air supplied by the blower 136, into the stationary inlet chamber 137 leading into the second cooling air chamber 46, which is made up of a large number of the drum-like members 51 (preferably, seventeen), and is mounted for rotation in the same manner as the previously described chambers, the same reference numerals being applied to corresponding parts in Figs. 10 and 2. The chamber 46 has a tapering inlet portion 76 that is the same as previously described, and into which the stationary inlet chamber 137 extends. The stationary inlet chamber is mounted on a suitable frame member 138 and a stationary housing or outlet chamber 88, similar to that previously described, is provided at the outlet end of the chamber 46 and is mounted on the framework 139. The cooling air passes from the chamber 43 through the conduit 134 and the conduit 135 into the chamber 46 and out of the chamber 46 through the air exhaust pipe 140. A raisin discharge spout 141 discharges the raisins passing through the chamber 46 onto a belt conveyor 142 that carries the raisins to suitable sieving and sizing means.

The raisins have been completely cooled and all the raisins that pass through the apparatus have been repeatedly subjected to both a stream of heated and a stream of cool air in passing through the chambers 31, 43 and 46 and are completely de-sulphurized by the time that the same pass out of the chamber 46 and onto the conveyor 142.

It has been found that the best results are obtained by subjecting the raisins to sulphurization in the chamber 20 for from about thirteen to fifteen minutes, and subjecting the raisins to treatment in the chambers 23, 31 and 43 for about the same length of time and to final de-sulphurization and cooling in the chamber 46 for from twenty-five to thirty minutes.

What I claim is:

1. In a method of treating raisins, subjecting sun-dried unbleached raisins in a damp state to sulphur dioxide while keeping said raisins in a constant state of agitation.

2. In a method of treating raisins, subjecting sun-dried unbleached raisins in a damp state to sulphur dioxide by repeatedly dropping thin streams of said raisins through a stream of sulphur dioxide crosswise of said stream.

3. In a method of treating raisins, subjecting sun-dried unbleached raisins in a damp state to sulphur dioxide by repeatedly dropping thin streams of said raisins through a stream of sulphur dioxide and constantly agitating thin layers of said raisins between said dropping actions while in a sulphur dioxide atmosphere.

4. In a method of treating raisins, subjecting sun-dried unbleached raisins in a damp state to sulphur dioxide while keeping thin layers of said raisins in a constant state of agitation, and next engaging thin layers of said raisins with heated air while keeping said raisins in a constant state of agitation.

5. In a method of treating raisins, subjecting sun-dried unbleached raisins in a damp state to sulphur dioxide by repeatedly dropping thin streams of said raisins through a stream of sulphur dioxide crosswise of said stream and next engaging said raisins with heated air by repeatedly dropping thin streams of said raisins through a stream of heated air crosswise of said stream and constantly agitating thin layer of said raisins between said dropping actions while in a body of heated air.

6. In a method of treating raisins, subjecting sun-dried unbleached raisins in a damp state to sulphur dioxide while keeping thin layers of said raisins in a constant state of agitation, next engaging said raisins with heated air while keeping thin layers of said raisins in a constant state of agitation and then engaging said raisins with a stream of unheated air while keeping thin layers of said raisins in a constant state of agitation.

7. In a method of treating raisins, subjecting sun-dried unbleached raisins in a damp state to sulphur dioxide by repeatedly dropping thin streams of said raisins through a stream of sulphur dioxide, constantly agitating thin layers of said raisins between said dropping actions while in an atmosphere of sulphur dioxide, next engaging said raisins with heated air by repeatedly dropping thin streams of said raisins through a stream of heated air and constantly agitating thin layers of said raisins between said dropping actions while in a body of heated air, and then engaging said raisins with unheated air by repeatedly dropping thin streams of said raisins through a stream of unheated air and constantly agitating thin layers of said raisins between said dropping actions while in a body of unheated air.

8. In a method of treating raisins, subjecting sun-dried unbleached raisins in a damp state to sulphur dioxide while keeping said raisins in a constant state of agitation, applying a spray of oil to said raisins after removal from engagement with said sulphur dioxide, and thereafter engaging said raisins with heated air while keeping said raisins in a constant state of agitation.

9. In a method of treating raisins, subjecting sun-dried unbleached raisins in a damp state to sulphur dioxide while keeping thin layers of said raisins in a constant state of agitation, applying a spray of oil to a thin stream of said raisins after removal from engagement with said sulphur dioxide, thereafter engaging said raisins with heated air while keeping thin layers of said raisins in a constant state of agitation, and then engaging said raisins with a stream of unheated air while keeping thin layers of said raisins in a constant state of agitation.

10. In a method of treating raisins, passing raisins lengthwise through a chamber containing sulphur dioxide and continuously agitating thin layers of and repeatedly dropping thin streams of said raisins from the upper portion to the lower portion of said chamber through the sulphur dioxide gas therein during their lengthwise passage through said chamber.

11. In a method of treating raisins, subjecting sun-dried unbleached raisins in a damp state to sulphur dioxide while keeping thin layers of said raisins in a constant state of agitation, and next engaging said raisins with heated air and sulphur dioxide while keeping thin layers of said raisins in a constant state of agitation.

12. In a method of treating raisins, passing raisins lengthwise through a chamber containing sulphur dioxide and continuously agitating thin layers of and repeatedly dropping thin streams of said raisins from the upper portion to the lower portion of said chamber during their lengthwise passage through said chamber, passing said raisins from said chamber into and lengthwise through a heating chamber, and continuously agitating thin layers of and repeatedly dropping thin streams of said raisins from the upper portion to the lower portion of said heating chamber during their passage therethrough.

13. In a method of treating raisins, passing raisins lengthwise through a chamber containing sulphur dioxide and continuously agitating thin layers of and repeatedly dropping thin streams of said raisins from the upper portion to the lower portion of said chamber during their lengthwise passage through said chamber, passing said raisins from said chamber into and lengthwise through a heating chamber, continuously agitating thin layers of and repeatedly dropping thin streams of said raisins from the upper portion to the lower portion of said heating chamber during their passage therethrough, passing said raisins from said heating chamber into and lengthwise through a chamber to which a cooling air stream is supplied, and continuously agitating thin layers of and repeatedly dropping thin streams of said raisins through said air stream during their passage through said chamber.

14. In an apparatus for treating raisins a rotatably mounted chamber comprising a plurality of open ended drums mounted in axially aligned end to end relation, each of said drums having a plurality of wide shelves extending inwardly from the peripheral wall thereof, said shelves being inclined to the radius of said drum and inclined lengthwise of said drum.

15. In an apparatus for treating raisins a rotatably mounted chamber comprising a plurality of open ended drums mounted in axially aligned end to end relation, each of said drums having an annular series of wide zinc shelves extending inwardly from the peripheral wall thereof, said shelves being inclined to the radius of said drum and inclined lengthwise of said drum, and means for slowly rotating said chamber in a direction such that the inner edges of said shelves are in advance of the edges thereof adjacent the peripheral walls of said drums.

16. In an apparatus for treating raisins a rotatably mounted chamber comprising a plurality of open ended polygonal drums mounted in axially aligned end to end relation, each of said drums having a plurality of wide shelves extending inwardly from the peripheral wall thereof, said shelves being inclined at an oblique angle to the wall portions from which the same extend so that the inner edge of each shelf is in advance of the edge thereof adjacent said wall in the direction of rotation of said chamber, and said shelves being inclined lengthwise of said drum.

17. In an apparatus for treating raisins a rotatably mounted chamber comprising a plurality of open ended polygonal drums mounted in axially aligned end to end relation, each of said drums having a plurality of wide shelves extending inwardly from the peripheral wall thereof, said shelves being inclined at an oblique angle to the wall portions from which the same extend so that the inner edge of each shelf is in advance of the edge thereof adjacent said wall in the direction of rotation of said chamber, and said shelves being inclined lengthwise of said drum, the adjacent ends of the shelves on adjacent drums being out of alignment.

18. In an apparatus for treating raisins a rotatably mounted chamber comprising a plurality of open ended drums mounted in axially aligned end to end relation, each of said drums having a plurality of wide shelves extending inwardly from the peripheral wall thereof, said shelves being inclined to the radius of said drum and inclined lengthwise of said drum, a sulphur dioxide generator, and means for passing sulphur dioxide from said generator longitudinally through said chamber.

19. In an apparatus for treating raisins a rotatably mounted chamber comprising a plurality of open ended drums mounted in axially aligned end to end relation, each of said drums having a plurality of wide shelves extending inwardly from the peripheral wall thereof, said shelves being inclined to the radius of said drum and inclined lengthwise of said drum, a housing around said chamber, means for supplying heated air to said chamber, and heating means within said housing.

20. In an apparatus for treating raisins a rotatably mounted chamber comprising a plurality of open ended drums mounted in axially aligned end to end relation, each of said drums having a plurality of wide shelves extending inwardly from the peripheral wall thereof, said shelves being inclined to the radius of said drum and inclined lengthwise of said drum, and cooling means for said chamber comprising means for passing a current of cooling air longitudinally through said chamber.

21. In an apparatus for treating raisins, a chamber, means for passing a stream of sulphur dioxide longitudinally through said chamber, means in said chamber for agitating and repeatedly dropping raisins through said stream of sulphur dioxide, a second chamber, means for introducing heated air to said second chamber, means in said second chamber for agitating and repeatedly dropping raisins in said second chamber, a third chamber, means for passing unheated air through said third chamber, means for agitating and repeatedly dropping raisins in said third chamber, means for transferring raisins from said first chamber to said second chamber and means for transferring raisins from said second chamber to said third chamber.

22. In a method of treating raisins, passing raisins lengthwise through a chamber containing sulphur dioxide and continuously agitating thin layers of and repeatedly dropping thin streams of said raisins from the upper portion to the lower portion of said chamber during their lengthwise passage through said chamber, passing said raisins from said chamber, applying a spray of oil to said raisins and thereafter passing said oiled raisins into and lengthwise through a heating chamber, continuously agitating thin layers of and repeatedly dropping thin streams of said raisins from the upper portion to the lower portion of said heating chamber during their passage therethrough, passing said raisins from said heating chamber into and lengthwise through a chamber to which a cooling air stream is supplied, and continuously agitating thin layers of and repeatedly dropping thin streams of said raisins through said air stream during their passage through said chamber.

ENRICO P. ALIOTTI.

References Cited in the file of this patent

UNITED STATES PATENTS

| Number | Name | Date |
|---|---|---|
| 690,005 | Anderson et al. | Dec. 31, 1901 |
| 765,381 | Fleming | July 19, 1904 |
| 1,353,209 | Barkis, Sr. | Sept. 21, 1920 |
| 1,382,850 | Pierce | June 28, 1921 |
| 1,711,729 | Forrest | May 7, 1929 |
| 1,835,237 | Moore | Dec. 8, 1931 |
| 1,883,722 | Greisen | Oct. 18, 1932 |
| 1,886,233 | Sanders | Nov. 1, 1932 |
| 1,976,801 | Nicholoy | Oct. 16, 1934 |
| 2,403,871 | McBean | Oct. 5, 1946 |